(No Model.)
F. BURGER.
APPLICATION OF DIFFERENTIAL POWER.
No. 477,736. Patented June 28, 1892.
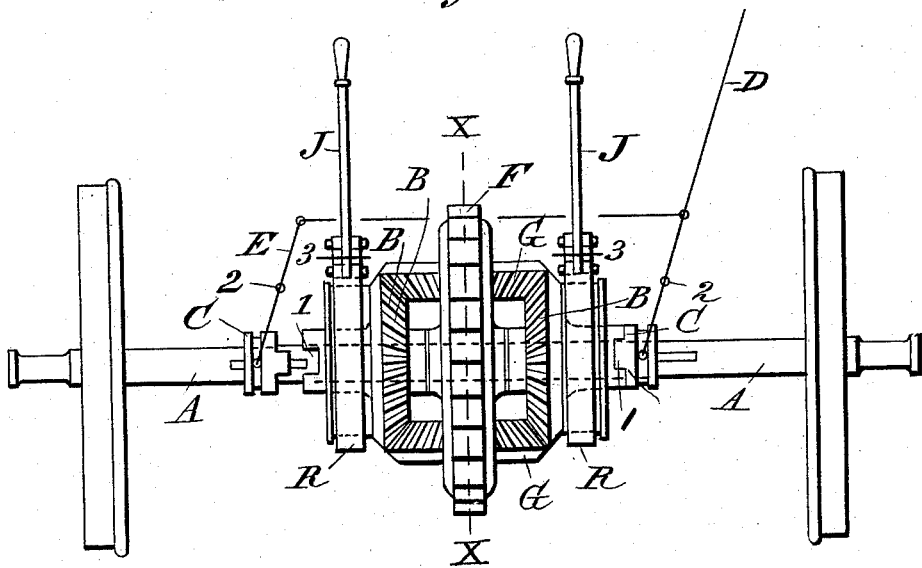
Fig.1.
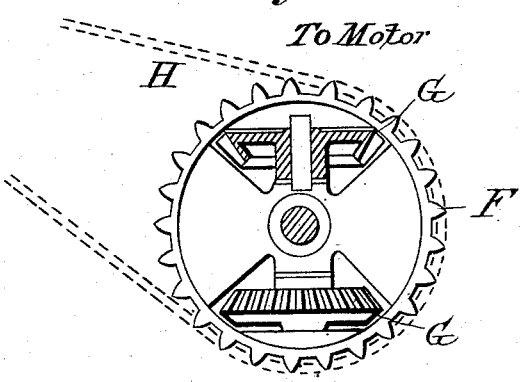
Fig.2.
Fig.3.
Witnesses:
John Buyers
Joseph R. Adams
Inventor:
Franz Burger
by John G. Manahan
his Atty.

UNITED STATES PATENT OFFICE.

FRANZ BURGER, OF STERLING, ILLINOIS, ASSIGNOR OF ONE-HALF TO
HENRY M. WILLIAMS, OF FORT WAYNE, INDIANA.

APPLICATION OF DIFFERENTIAL POWER.

SPECIFICATION forming part of Letters Patent No. 477,736, dated June 28, 1892.

Application filed August 28, 1891. Serial No. 404,027. (No model.)

*To all whom it may concern:*

Be it known that I, FRANZ BURGER, a citizen of the United States, residing at Sterling, in the county of Whiteside and State of Illinois, have invented certain new and useful Improvements in the Application of Differential Power; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention has reference to the application of differential power as utilized in driving irregular mechanism, vehicles, or cars of any kind.

The purpose of my invention is, first, to provide means by which produced power of a uniform character may be applied in varied degrees of force and of velocity to suit the variant exigences of the occasion; second, to provide means by which the vehicle or other mechanism driven may be driven in an opposite direction without changing the direction of movement of the motor. I accomplish these objects by the mechanism illustrated in the accompanying drawings, in which—

Figure 1 is a plan of the axle of a street-car provided with my invention. Fig 2 is a vertical cross-section in the line X X of Fig. 1. Fig. 3 is a side elevation of a brake-strap and its adjunctive devices.

A is a car-axle suitably supported upon carrying-wheels.

B B are beveled gears loosely seated on the axle A with their gear-faces inward.

C C are clutches feathered upon the axle A and adapted to engage, respectively, recesses 1, formed in the outer edges of the hubs of the gear-wheels B, and by such engagement lock said wheels upon the axle A.

D is a lever pivotally attached at its lower end to one of the clutches C and suitably fulcrumed at 2 on the frame of the machine. A transverse rod E' connects the lever D with a similar lever E, attached in a similar mode to the opposite clutch C. It will be noticed that the lateral movement of the lever D moves each of the clutches C; but the movement of one of said clutches is out of engagement with its adjacent wheel B when the other clutch is moved into such engagement, and vice versa; but the clutches are so located that both may be out of engagement at the same time. The function, therefore, of the lever D is to optionally lock, through the medium of the clutch C, one of the wheels B to the axle A, so as to transmit the rotation of said wheel to said axle.

F is a sprocket, band, or gear wheel seated loosely centrally upon the axle A and driven in any suitable mode by any desired motor. Within the wheel F are pivotally seated inner-faced beveled gears G G of a size and conformation corresponding to the aforesaid beveled gears B. The width of the wheels G G is such that they extend laterally beyond the wheel F and engage the wheels B at each of the lateral extremities, so that the inner faces of the wheels G G B B form substantially a square, as shown in Fig. 1.

H represents the chain or belt by which rotation is communicated by the driving mechanism to the wheel F.

It is obvious that if either one of the wheels B be out of engagement with its companion clutch C, so that such disengaged wheel would run loosely on axle A, the rotation of the wheels G will impart no rotation to the locked wheel B on the axle A, but that the wheels G would simply traverse the periphery of the keyed wheel B without rotating the latter in any degree. It is equally true that if the loose wheel B be held in any degree against rotation, so as to operate, *pro tanto*, as a fulcrum for the wheels G, the locked wheel B will be proportionately rotated. To illustrate: If the normal revolution of the wheels G be eighty per minute and one of the wheels B be keyed to the axle A and the other of the wheels B be simply an idler on said axle, the idle-wheel B will have eighty revolutions a minute, while the keyed wheel B will have none; but if resistance to its rotation be exerted upon the idle-wheel B so as to reduce the number of its revolutions to sixty per minute the other twenty revolutions will be performed by the keyed wheel B, and if the idle-wheel B be held by traction or otherwise so that its revolutions will be reduced to forty per minute then the remaining forty revolutions per minute to make the complement of movement of the wheels G will be furnished by the opposite wheel B, carrying with it, of course, the axle A.

In Fig. 3 is exhibited a side elevation of the mechanism for exerting restraining traction optionally on either of the wheels B. J is a hand-lever suitably fulcrumed at 3 on the frame of the machine. R is a brake-strap fastened at one end to the lever J below the pivot 3 and at the other end to said lever above the pivot 3 and passed intermediately around the outside of the beveled wheels B. It is obvious that by moving the lever J in one direction the brake-band can be tightened upon the periphery of the gear-wheel B in any degree, so as to retard the rotation and lessen the number of revolutions of the latter. Each of the wheels B, being provided with such restraining lever and strap, it will be seen that great control over the amount of power from the wheels G to be transmitted to the axle A is within the power of the operator.

My invention is specially applicable to gas-engines, electric motors, and all that species of mechanism in which it is inconvenient to vary or reverse the motor-power after it is once put in operation. One wheel G will operate fairly well. It is obvious that the rotation of the axle A and the movement of the vehicle may be reversed by simply alternating the locking of wheels B to said axle.

What I claim as my invention, and desire to secure by Letters Patent of the United States, is—

1. The combination of a continuously-rotating wheel F, gear-wheel G, carried therein, axle A, gear-wheels B, seated thereon in position to engage wheel G, and means, substantially as shown, for optionally locking either of said wheels B, for the purpose described.

2. The combination of the continuously-rotating wheel F, gear G, seated therein and carried thereby, axle A, wheels B, seated thereon, means for optionally locking either of wheels B to said axle, and means, substantially as shown, for retarding the rotation of the disconnected wheel B, substantially as shown, and for the purpose described.

3. The combination of gears B, axle A, and the continuously-driven wheel F, seated loosely centrally thereon, gear-wheels G, seated transversely therein and carried thereby between gears B, carried on axle A laterally to wheel F, and adapted to engage wheels G, means for optionally locking either of wheels B upon said axle, and means, substantially as shown, for retarding the rotation of the unlocked wheel B, for the purpose described.

4. The combination of a rotating axle A, motor-wheel F, seated loosely and centrally thereon, gear-wheels G, seated within and carried by said wheel F, gear-wheels B, seated loosely on axle A at each side of wheel F, adapted to be coincidently engaged by wheels G, means for optionally locking either of the wheels B rigidly upon said axle, and means for restricting or retarding the rotation of the wheel B not locked to said axle, substantially as shown, and for the purpose described.

In witness whereof I affix my name hereto in the presence of two witnesses.

FRANZ BURGER.

Witnesses:
ZUDLOK T. GALT,
AUGUSTUS P. SMITH.